J. W. BROWN.
METHOD OF CEMENTING CARBON ARTICLES.
APPLICATION FILED JUNE 6, 1912.
1,158,171.
Patented Oct. 26, 1915.
2 SHEETS—SHEET 2.
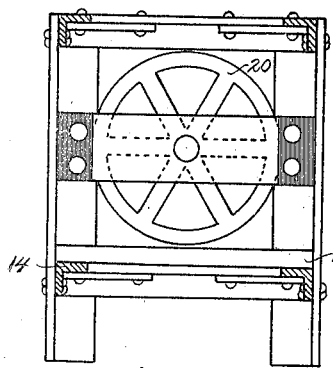
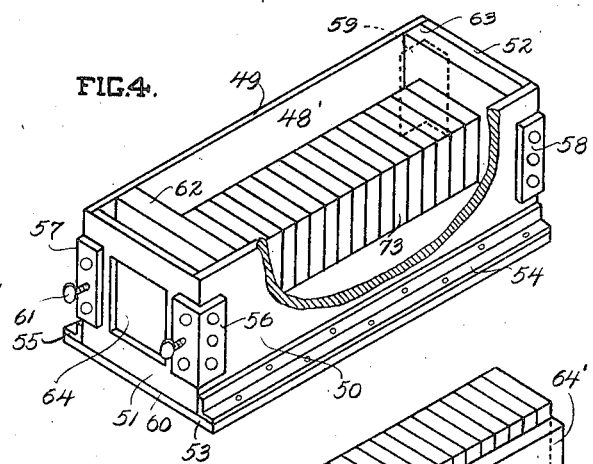
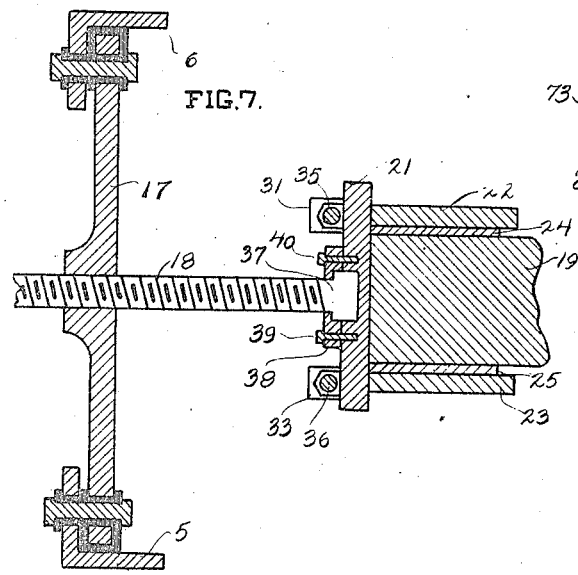
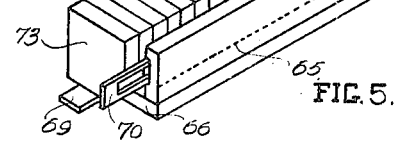
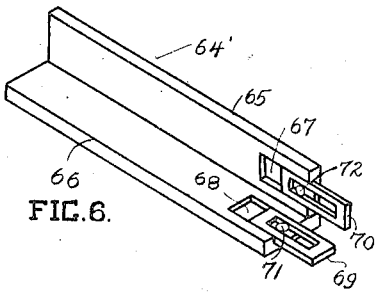
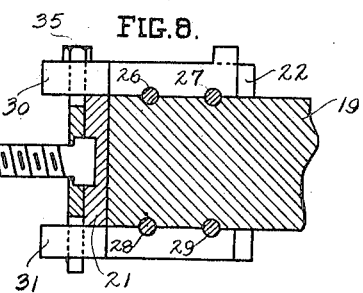
WITNESSES
INVENTOR
JOHN W. BROWN
BY Ira J. Adams
ATTORNEY

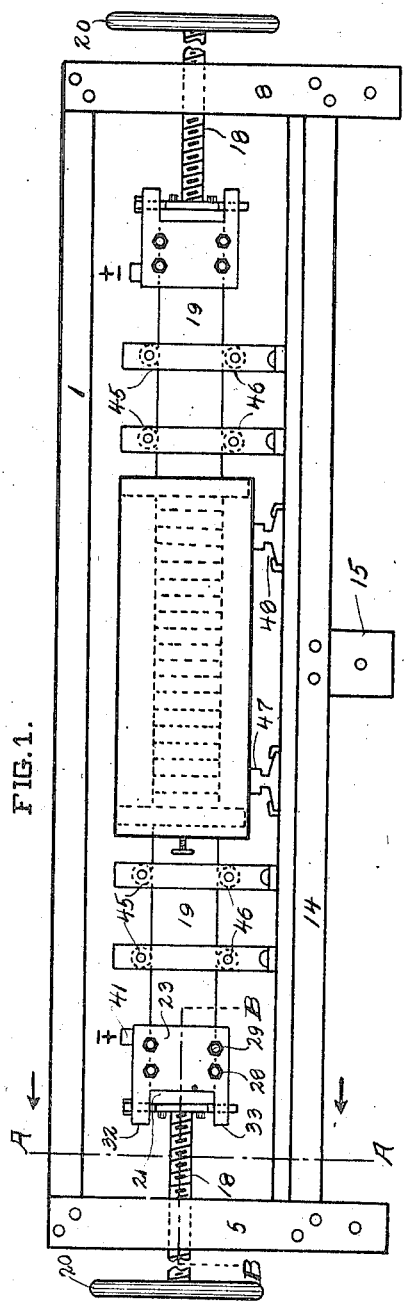

UNITED STATES PATENT OFFICE.

JOHN W. BROWN, OF LAKEWOOD, OHIO, ASSIGNOR TO NATIONAL CARBON COMPANY, OF CLEVELAND, OHIO, A CORPORATION OF NEW JERSEY.

METHOD OF CEMENTING CARBON ARTICLES.

1,158,171.  Specification of Letters Patent.  Patented Oct. 26, 1915.

Application filed June 6, 1912. Serial No. 702,120.

*To all whom it may concern:*

Be it known that I, JOHN W. BROWN, a resident of Lakewood, in the county of Cuyahoga, in the State of Ohio, have invented new and useful Improvements in the Method of Cementing Carbon Articles, of which the following is a clear and exact description.

This invention relates to the treatment of carbon articles.

One object of the invention is to close seams and laminations in carbon articles and cement them together so that the defects no longer exist.

Another object is to compress carbon articles and cement together the surfaces of the pores and cells originally therein.

Other objects will appear in the appended description.

The term carbon used in this application is not intended to be specific, but to include all forms of carbon such as amorphous carbon, graphite and other forms.

In another application filed June 6th, 1912, Serial No. 702119 I have disclosed a method of closing defects such as seams and laminations in carbon articles, but this application is an improvement over that method in that the laminations are entirely cemented together, and a solid coherent mass is obtained from the defective article.

Baked carbon articles are somewhat porous due to the escape of volatile matter in the baking process. This is objectionable as the resistance is therefore higher than it should be and in the case of electrolytic anodes the porosity causes the rapid deterioration of the anode, due for the one thing to the increased surface exposed to the attack of the electrolyte. The mechanical strength of the article is also impaired.

I have discovered a process whereby the articles can be made more dense by substantially relieving them of their porous nature. As described in my other application above referred to I have found that when carbon articles are heated to a very high temperature they become semi-plastic and the carbon material can be made to flow by applying pressure thereto. This characteristic of carbon must not be confused with that due to uncoked binder. It is well known that "green" carbon articles are dense and solid under ordinary temperatures, but become plastic under pressure, especially when heated slightly to soften the uncoked binder. The plasticity of carbon that I refer to is that of a baked carbon article with the binder coked. When heated in accordance with my process, the carbon particles themselves become plastic. A carbon article can therefore be compressed and made more dense by heating it till it becomes plastic and then applying pressure or by putting pressure on before the article becomes plastic as will be later explained. I have further found that if a porous article be first impregnated with tar, oil or other binding material before it is heated and compressed, the surfaces of each collapsed pore adhere firmly together and a dense mass is produced with each particle joined to adjacent particles. This means that the resistivity will be lowered and the mechanical strength increased.

When carbon articles are graphitized by the Acheson process many of them develop seams and laminations. The percentage of the defective articles sometimes runs as high as 75% of the furnace charge. These were formerly utilized as scrap. The defects can readily be corrected by my invention so that a great saving results.

In my other application referred to I disclose a way to compress defective articles so that fissures and seams are eliminated. The resulting product still has the separated surfaces, as they will not firmly unite, and for most purposes is as good as if the surfaces were firmly united. By first treating the articles with tar, oil or other binder as previously disclosed herein, the surfaces will adhere together so that the compressed article no longer has the separations, and is rigid through all its portions. The carbon articles can be dipped in the tar, oil or other solution or these substances may be incorporated in the article in any other way. After this treatment they are placed in an electric furnace and heated by the electric current under pressure. The high temperature for accomplishing this result most satisfactorily is obtained by use of the electric current, and preferably by sending the current through the articles to be treated; though the same results at a lesser degree may be obtained by gas heating. The method is not limited to any specific apparatus, but could be carried out by many different forms of appliances. However, for the purpose of completely disclosing the method, I have shown on the drawings a type of electrical apparatus well suited for the purpose.

In the drawings: Figure 1 is a side elevation of the apparatus which may be called a furnace, although it has no resemblance to the usual type of furnace. Fig. 2 is a top view of the same. Fig. 3 is a sectional view taken on the line A—A of Fig. 1 looking in the direction indicated by the arrows. Fig. 4 is a view of the box containing the articles to be treated showing them clamped in place. Fig. 5 is a view of the device used to place the carbon articles in the box of Fig. 4. Fig. 6 is a view of the form shown in Fig. 5 before the articles are placed therein. Fig. 7 is a sectional view of parts of the furnace frame and electrode taken on the line B—B of Fig. 1. Fig. 8 is a sectional view of part of the electrode taken on the line C—C of Fig. 2. Fig. 9 is an enlarged end view of a carbon brush having seams or laminations.

Referring to Figs. 1 and 2, the furnace frame can be made of wood or any other material, though it has been shown as being made of angle irons. At the top there are two angle irons 1 and 2 joined to similar irons 3 and 4 at the ends. The angle irons may be joined together in any way, but I have shown them as being mitered so as to form a neat joint, and riveted or jointed to four posts 5, 6, 7 and 8. In order to make the frame more rigid the irons may be braced by the braces 10, 11, 12 and 13. The lower frame, one member of which 14 is shown in Fig. 1 is identical in all respects to the upper frame. I have shown two metal supports 15 and 16 fastened to the lower frame at the middle. The legs or supports of the furnace may be bolted to posts or pillars, or they may be simply fastened to a table or floor as desired. The lower frame is preferably covered with a layer of some nonconducting substance 16' such as transite board, composed of asbestos and cement. Such material forms a very strong board and will answer well the purpose of this arrangement.

By referring to Fig. 3 and Fig. 7, it will be seen that the member 17 is joined to the corner posts 5 and 6, and insulated therefrom. The insulation may consist of fiber board or any other well known suitable nonconducting material. A screw 18 connected to the electrode 19 passes through the threaded opening in the member 17. The screw is revolved by any means, but I have shown a wheel 20 which is insulated therefrom in any way. A good way to do this is to construct the spokes of wood. The electrode may be joined in any manner to the screw 18. I have shown a metal end plate 21 which rests against the end of the electrode 19, and is held in place by two plates 22 and 23. In order to make good electrical connection with the electrode, two copper plates 24 and 25 are clamped by the plates 22 and 23 against the electrode. The plates are held firmly by the bolts 26, 27, 28 and 29. Grooves are preferably cut in the edge of the electrode to admit of the passage of the four clamping bolts. The clamping plates 22 and 23 have two ears each 30, 31 and 32, 33 which extend past the end of the electrodes sufficiently to enable pins 35 and 36 to be passed behind the plate 21 through the holes in the ears of the plates. The screw 18 has a circular head 37 bearing in a circular cavity in the plate 21. The plate 38, having a corresponding cavity and a hole for the passage therethrough of the screw 18, is fastened to the plate 21 by appropriate means such as a screw 39 and a screw 40. Lugs 41 and 42 on the copper plates 24 and 25 are provided so that conducting cables can be connected thereto. These are marked ± and ∓ on the drawings to indicate that they are the terminals. The electrode is held in place and properly guided by pairs of straps 43 and 44 joined together by pairs of rollers 45 and 46 above and below the electrode. The rollers permit of the electrode being moved back and forth by means of the operating wheel 20 with minimum friction. The straps are secured to the board 16' by appropriate screws or bolts. The rollers 45, 46 and the straps 43, 44 could be formed of iron, but since they would form a closed magnetic circuit around the electrode, the hysteresis loss might be high enough to cause trouble. If either the straps or the rollers were made of non-magnetic metal this trouble would be avoided. The trouble could also be obviated by using some material such as transite or fiber for this purpose.

The right hand side of the furnace in all its details is exactly identical with that of the left hand which has just been fully described so that it is unnecessary to allude to it in particular. The parts of the electrode and its connections are numbered similarly to those on the right.

Two iron rails 47 and 48 are fastened to the board 16' to serve as supports for the box which contains the articles to be heated and compressed. The box shown in Fig. 4 consists of two sides 49 and 50 joined to two end pieces 51 and 52 and the bottom 53. These boards are preferably made of transite board or other materials that would serve the purpose equally as well. The box can be made stronger by means of angle irons 54 and 55 joined to the bottom and sides. End plates 56 and 57, 58 and 59 may be fastened to the corners where the sides join the ends in order to further strengthen the box. The strengthening irons used on the box are not absolutely necessary, and in order not to render the showing confusing in Figs. 1 and 2, the box is there shown without them.

For a purpose to be later described two screws 60 and 61 are threaded through irons 56 and 57 and the member 51 to press against the conducting block 62. It is not necessary to have similar screws on the other end of the box, hence the conducting block 63 bears against the end member 52. The two end members 51 and 52 have openings therein to receive the two electrodes 19. The opening in the board 52 is not shown in Fig. 4, but it is identical with that in the end 51.

In order to facilitate the placing of the brushes in the box 48', a device 64' shown in Fig. 6 may be used. This consists of two boards 65 and 66 fastened together to form an angle. These boards may be made of any materials, but wood is most convenient. Two slots 67 and 68 in these boards receive members 69 and 70 in a loose fit. Screws or pins 71 and 72 pass through slots in the members 69 and 70 and hold them in place.

The use of the apparatus disclosed will now be given in detail. The articles to be heated and compressed are shown as blocks 73. These are placed side by side in the angled form 64' as shown in Fig. 5 with the cracks or laminations approximately perpendicular to the direction of the electrodes. By referring to Fig. 5, it will be noted that the end block 73 extends past the boards 65 and 66, and is substantially flush with the ends of the members 69 and 70. The device 64' and the brushes therein are taken by the operator and placed in the box 48' and held so that the center line of the brushes is approximately in line with the center line of the blocks 62 and 63, and then the screws 60 and 61 are manipulated forcing the block 62 against the column of carbon articles, which clamps them firmly together against the block 63. The members 69 and 70 slide in the slots 67 and 68, and permit the carbon blocks to be clamped in place without clamping the device 64' at the same time. The latter is then removed by the operator. If desired the box may be placed in the furnace and the current turned on without covering the articles with any heat insulating material. It is preferable, however, to fill the space in the box 48' by some heat insulating material and in practice I have found that broken pieces of charcoal serve the purpose well. A bag of broken charcoal can be emptied into the box 48' and it will flow into the space at the sides and below the carbon blocks 73. Sufficient charcoal should also be placed on top to cover well the carbon blocks. The box 48' with the carbon articles and the heat insulating material is then placed by the operator on the rails 47 and 48 of the furnace and slid into place in proper alinement with the two electrodes 19. The wheels 20 are then manipulated to push the electrodes through the openings in blocks 62, 63 to press them against the carbon articles and more firmly press them in contact with each other. The current is then turned on. The current density may be any value desired. I have used current densities as high as 5000 amperes per square inch. An average density of 1000 amperes per square inch is sufficient to make the carbon articles semiplastic in a very short time. The time required, of course, will depend upon the density of the current. By making tests of various current densities I have found that an increase in current will bring about a much greater decrease of time. The articles need not be put under pressure till the articles begin to soften, but it is advisable to put some pressure on them at the start. After the articles begin to soften the pressure may be increased by manipulating the handle 20. The essential thing is to put pressure on the articles when they become plastic. The method is therefore the same whether the pressure is applied before the current is turned on or after the articles begin to soften. I prefer, however, to put the full pressure on at the start. This is sufficient to compress the articles when they become plastic. When the process is complete the current is turned off and the electrodes are drawn from the opening in the end plates of the box 48'. The box is then removed and the contents dumped into a receptacle. Another box can have been filled by the one operator or by others if more are needed, so that the furnace can be kept almost continually in operation. An article treated by this process will no longer have laminations or seams. If it be broken up the pieces will show no free surfaces existed.

While the use of the device 64' is very convenient in placing the carbon articles in place in the box 48', it is not necessary to use this scheme alone. The box could be filled up with a proper amount of charcoal and then the articles could be placed in between the electrodes on top of the charcoal. I prefer, however, to use the device 64'.

The procedure for compressing articles to make them more dense is the same as previously outlined though, of course, when the sole purpose is to increase the density the articles are treated regardless of whether they are free from flaws or have cracks or laminations.

Having described my invention what I claim is:

1. The method of compacting a baked carbon article with carbonaceous binder which consists in impregnating it with a cementing material, placing it under pressure and passing an electric current therethrough, whereby the particles flow and are cemented together.

2. The method of compacting a baked carbon article with carbonaceous binder which consists in impregnating it with tar, placing it under pressure and passing an electric current therethrough, whereby the particles flow and are cemented together.

3. The method of compacting a baked carbon article with carbonaceous binder which consists in impregnating it with a cementing material, heating the carbon and submitting it to pressure to cause the particles to flow and cement together.

4. The method of compacting a baked carbon article with carbonaceous binder which consists in impregnating it with tarry material, heating the carbon and submitting it to pressure to cause the particles to flow and cement together.

5. The method of eliminating seams and laminations in a carbon article which consists in impregnating it with a tarry material, passing an electric current through it until the carbon becomes plastic and submitting it to pressure whereby the surfaces are cemented together.

6. The method of eliminating seams and laminations in a baked carbon article which consists in impregnating it with a cementing material, passing an electric current through it until the carbon becomes plastic and submitting it to pressure whereby the surfaces are joined and cemented together.

7. The method of eliminating seams and laminations in a carbon article, which consists in impregnating it with a tarry material, heating it to a high temperature until the carbon becomes plastic, and putting it under pressure to cause the surfaces of the seams and laminations to join and be cemented together.

8. The method of eliminating seams and laminations in a carbon article, which consists in impregnating it with a cementing material, heating it to a high temperature until the carbon becomes plastic, and putting it under pressure to cause the surfaces of the seams and laminations to join and be cemented together.

In testimony whereof I have hereunto signed my name.

JOHN W. BROWN.

Witnesses:
H. G. GROVER,
I. J. ADAMS.